United States Patent [19]
Khan et al.

[11] Patent Number: 6,134,087
[45] Date of Patent: Oct. 17, 2000

[54] LOW VOLTAGE, HIGH DISPLACEMENT MICROACTUATED DISK DRIVE SUSPENSION

[75] Inventors: Amanullah Khan; Shijin Mei, both of Temecula, Calif.

[73] Assignee: Magnecomp Corp., Temecula, Calif.

[21] Appl. No.: 09/207,286

[22] Filed: Dec. 8, 1998

Related U.S. Application Data

[60] Provisional application No. 60/088,731, Jun. 10, 1998.

[51] Int. Cl.[7] .................................................. G11B 5/596
[52] U.S. Cl. ........................................................ 360/294.6
[58] Field of Search ................................. 360/109, 294.4, 360/294.6

[56] References Cited

U.S. PATENT DOCUMENTS

| | | | |
|---|---|---|---|
| 5,764,444 | 8/1998 | Imamura et al. | 360/109 |
| 5,781,381 | 7/1998 | Koganezawa et al. | 360/109 |
| 5,796,558 | 8/1998 | Hanrahan et al. | 360/109 |

*Primary Examiner*—Robert S. Tupper
*Attorney, Agent, or Firm*—Louis J. Bachand

[57] ABSTRACT

A disk drive suspension comprising a load beam utilizing a piezoelectric microactuator has bendable arcuate spring portion elements which further curl or flatten in response to contraction or expansion of the piezoelectric microactuator to facilitate greater distance beam displacement at lower levels of voltage.

25 Claims, 3 Drawing Sheets

6,134,087

LOW VOLTAGE, HIGH DISPLACEMENT MICROACTUATED DISK DRIVE SUSPENSION

RELATED APPLICATION

This application claims the benefit of U.S. Provisional Application Serial No. 60/088,731, filed Jun. 10, 1998.

BACKGROUND OF THE INVENTION

1. Field of the Invention

This invention relates to disk drive suspensions and, more particularly, to load beams for disk drive suspensions. The invention suspensions utilize microactuation by a piezoelectric crystal to shift the load beam distal end relative to a disk to be read.

2. Related Art

Load beams are used to carry sliders containing read/write heads adjacent spinning disks. The load beam has a base portion anchored to an actuator arm that pivotally shifts the load beam and its associated slider angularly to move between tracks on the disk. The mass and inertia of conventional actuators means it requires considerable power to operate them.

SUMMARY OF THE INVENTION

It is an object of the present invention to provide an improved suspension. It is a further object to provide a load beam of novel design. It is a further object to provide for the actuation of a suspension load beam with microactuators acting against a bendable beam spring portion having an expansion and contraction capability. It is a further object to utilize piezoelectric crystals acting between the load beam base portion and the beam portion across the spring portion under voltages of less than about 40 volts and achieving displacements of the load beam carried slider of about 2 micrometers in the Y-axis. It is a still further object to provide a load beam having specially conformed spring elements to support the beam portion but also to readily allow changes in dimension of the spring portion through the decrease or increase in an arcuate section of the spring elements. Yet another object is to selectively reduce, as by etching, the initial or given thickness of the spring elements to facilitate bending action.

The invention accordingly provides a disk drive suspension comprising a load beam having a base portion, a spring portion and a beam portion adapted to carry a slider in operating proximity to a disk, a dimensionally variable electrodynamic microactuator coupled to the base portion and the beam portion and across the spring portion in beam portion displacing relation to the base portion over a distance that is a function of an applied voltage to the microactuator and the resistance of the spring portion to changes in dimension, the spring portion being locally bendable to provide low resistance change in spring portion dimensions, whereby the beam portion is displaced an increased distance at a given applied voltage.

In this and like embodiments, typically, the suspension includes left and right hand microactuators acting from the base portion on the beam portion in displacing relation, the microactuator is angled relative to the longitudinal axis of the load beam in a manner to apply a torque force on the spring portion, the microactuator comprises a piezoelectric crystal, and/or the applied voltage is less than about 40 volts, the beam portion is displaced up to 2 micrometers in the Y-axis, and the spring portion is locally reduced in thickness relative to said beam portion thickness for reduced resistance to bending.

In a further embodiment the invention provides a disk drive suspension comprising a load beam having a base portion, a spring portion and a beam portion adapted to carry a slider in operating proximity to a disk, a left and right hand, dimensionally variable, piezoelectric crystal microactuator each coupled to the base portion and the beam portion and across the spring portion in beam portion displacing relation to the base portion over a distance that is a function of an applied voltage to the microactuator and the resistance of the spring portion to changes in dimension, the spring portion comprising a locally arcuate spring elements providing low resistance change in spring portion dimensions, whereby the beam portion is displaced an increased distance at a given applied voltage.

In this and like embodiments, typically, the spring portion comprises left and right spring elements, each spring element having an arcuate section, the arcuate sections tending to flatten to a greater radius curve when the spring portion element is elongated by action of the microactuator and to curl to a lesser radius curve when the spring portion element is contracted by action of the microactuator and individually for each spring element, the left and right hand microactuators are angled to converge toward each other, e.g. at an included angle of between 5 and 60 degrees, at the proximate end of the load beam toward the longitudinal axis of the load beam in a manner to each apply a separate torque force on the spring portion, each spring element has an arcuate section intermediate the spring element ends, the arcuate sections tending to flatten to a greater radius curve when the spring portion element is elongated by action of the microactuator and to curl to a lesser radius curve when the spring portion element is contracted by action of the microactuator and individually for each spring element, each spring element comprises a unitary part of a common web with the beam base portion and the beam portion, the spring element having fore and aft tabs connected to the beam and base portions respectively and an arcuate section connected to the fore and aft tabs in beam supporting relation relative to the base, the spring elements being generally parallel, separated and of like curvature in their arcuate sections, the spring portion comprises left and right spring elements, the spring element arcuate sections being etched over the central portion thereof, eg. over the middle 20 to 40% of the section length, to a reduced thickness relative to the remainder of the arcuate sections, and the microactuator right and left piezoelectric crystals are coupled between the base and beam portions inboard of the left and right spring elements, and/or each piezoelectric crystal is about 0.0075 inch in thickness, the applied voltage is less than 40 volts, the beam portion is displaced up to 2 micrometers in the Y-axis, In its method aspects, the invention provides the method of actuating the beam portion of a load beam having a base portion, a spring portion and a beam portion, including shifting the left and/or right hand side of the beam portion responsive to a torque forces exerted by a microactuator between the base portion and the beam portion, and supporting the beam portion with a load beam spring portion comprising left an right hand bendable spring elements, the method further typically including defining an arcuate portion in each spring element that increases or decreases in radius in response to exertion of torque forces to facilitate greater distance beam displacement at lower levels of voltage, and optionally defining an etched zone of reduced thickness intermediate the ends of said spring element arcuate portion.

BRIEF DESCRIPTION OF THE DRAWINGS

The invention will be further described as to certain illustrative embodiments in conjunction with the attached drawings in which.

DETAILED DESCRIPTION

The invention uses piezoelectric crystal material as a microactuator in a data recording head suspension. Conventional servo actuation is not effective when the disks have a high density of tracks-per-inch (TPI) such as about 25 to 30 KTPI since they are no longer able to follow the tracks for magnetic reading and writing. Further, the mass and inertia of the conventional actuator system requires considerable power to operate. In the invention the piezoelectric crystal is used as a microactuator variable member (motor) after being fastened to the base portion and the beam portion of the load beam, across the spring portion. Microactuators are used for fine, or micro, increments of adjustment of the load beam form to critically place the head in position in contrast to the relatively gross movements of an actuator arm.

The position of piezoelectric element is optimized according to the off-track motion requirement (2 micrometers). The present Underwriter's Laboratories' limitation in piezoelectric crystal material charging capacity ordains that the applied voltage should not exceed about 40 volts (for single sheet piezoelectric material 0.0075 inch thick). As a consequence the physical change in dimension with an applied voltage, sometimes called herein the excitation force, produced by the piezoelectric material has a limit determined by the limit on voltage input. The limit with conventional design load beams having nonbendable and inextensible spring portions is less than the desired 2 micrometers of Y-axis off-track motion, e.g. 1.5 micrometers or less.

In accordance with the invention, larger Y-axis, off-track motions are realized without exceeding the about 40 volt limit on the crystals with a special design of load beam spring portion. Specifically the invention design provides a plural element load beam spring portion in which the elements are bendable, e.g., through having an arcuate section along their length that permits freer movement of the spring portion by the piezoelectric crystal microactuator. For even freer bending, the arcuate section may be etched to a reduced thickness. The freer spring movement uses less power to overcome spring portion resistance and more power is therefore available to farther shift the beam portion and slider, including up to the desired 2 micrometers. The invention achieves, eg., with its flexible arcuate sections in the spring portion elements this larger Y-axis off-track motion of the slider and recording head, despite applying less than about 40 volts on the piezoelectric elements.

Figure 6:
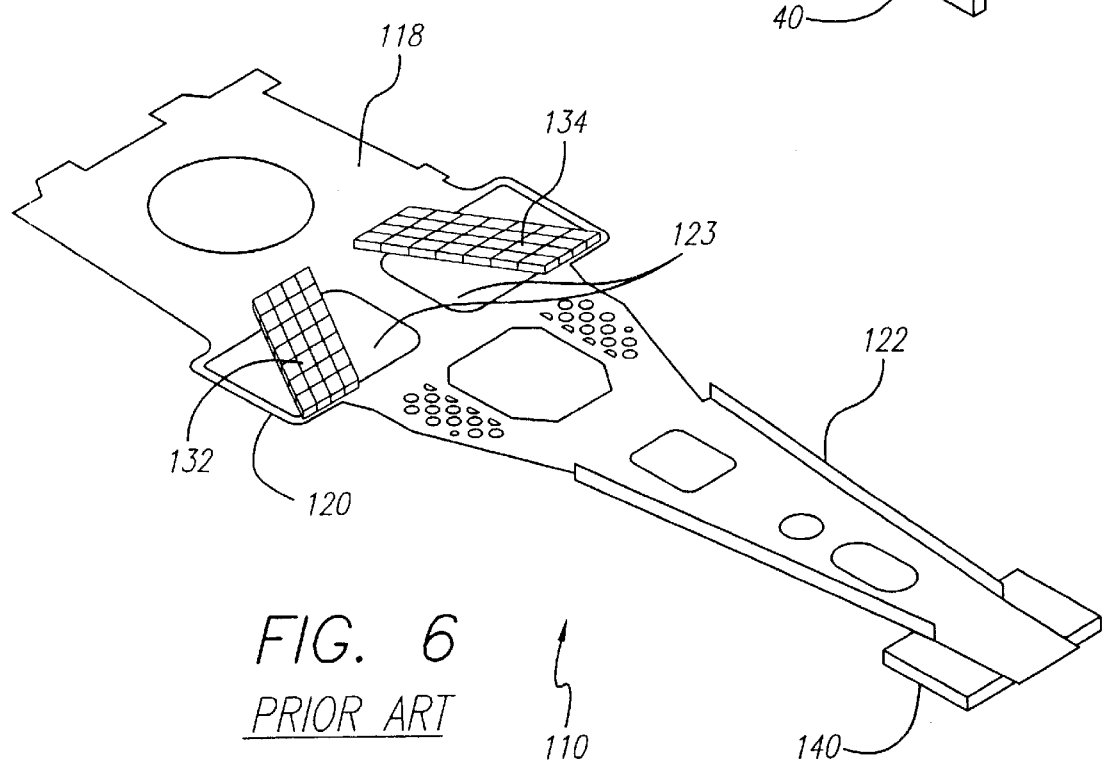
Figure 5:
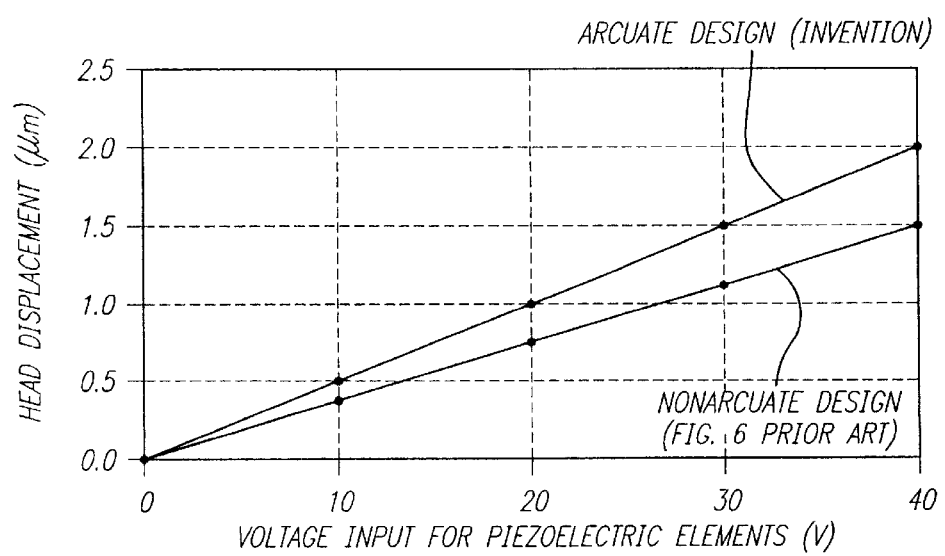
FIG. 5 is a graph depicting the difference in displacement of a load beam beam portion at 40 volts input into the microactuator for a nonarcuate vs. an arcuate spring portion; and, FIG. 6 is a PRIOR ART view of a nonarcuate spring portion load beam with microactuator.

In FIG. 6 (PRIOR ART), the load beam 110 has a spring portion 120 that is flat and without bendable or arcuate sections. The piezoelectric elements 132, 134, are bonded to the load beam base portion 118 and to the beam portion 122 with suitable bonding adhesive such as silver filled epoxy resin, in a manner to bridge the and cross the two openings 123 in the spring portion, forming two bridges. Silver-filled epoxy, or other conductive resin is used so that voltage, or charge, can be applied to the surfaces of the piezoelectric crystal. The piezoelectric elements 132, 134 will increase in dimension and thus give excitation force if a voltage is applied on the piezoelectric elements. In the load beam 110 form shown and with the piezoelectric elements 132, 134 mounted as shown in the Figure, their excitation force is not sufficient to both shift the slider 140 on the Y-axis and overcome the constraint imposed by the rigidly sized, dimensionally inflexible and fixed spring portion 120. As a result, the shifting or displacement effected by the reaction force between the piezoelectric element and the load beam is very small and cannot produce enough off-track motion at the slider 140 location with only 40 volts applied. A significant increase in voltage will move the load beam farther, but the crystals at the desired thickness of 0.0075 inch are not suited to receiving these higher voltages. In FIG. 5 the typical displacement or shifting of the slider at 40 volts with the FIG. 6 spring portion is shown; it is at about 1.5 micrometers and below the 2 micrometers desired.

In accordance with the invention, it has now been discovered that the problem posed by piezoelectric crystal electrical constraints on the one hand and load beam physical constraints on the other is solved by introducing dimensional flexibility to the load beam spring portion without reducing or altering its spring portion effectiveness by fabricating the bendable spring portion elements, e.g., to have arcuate sections in the spring portion. These arcuate sections, while they support the load beam beam portion just as a conventional spring portion, e.g., portion 120 in FIG. 6, further have the capability, separately and independently, to flatten or curl under elongating or contracting loads imposed by the crystal element mounted to the load beam.

The invention in a preferred embodiment uses a plurality of spring portion elements, typically two or three, each with a "C-shape"; that is, an arcuate or "C-shaped" section is defined along the length of each spring element, and with the spring elements they are part of they are located on either side of the piezoelectric elements. The curvilinear contour or radius of the spring element arcuate sections can vary depending on the specific structure from an ideal 180° angle to one plus or minus 30° to 60° from the 180° value. The arcuate section offers less constraint than that of flat, non-curved designs. With the elongation and compression of the piezoelectric element, the arcuate sections provide a physical conformation for the spring elements to extend or compress. With a small excitation force from the piezoelectric element, there is reconformation in the off-plane arcuate figures with less stress than may be involved in reshaping a conventional spring portion.

Typically, the relationship between voltage input and off-track motion at the slider in the arcuate element design is better than that of flat design. The Y-axis displacement at the head is about 7.86e-5 inch (2 micrometers). The maximum stress is low (6 kpsi) and far below the yield stress (185 kpsi). Further, the arcuate-sectioned spring portion load beam has a highly satisfactory sway mode frequency of 8.9 kHz.

Figure 1:
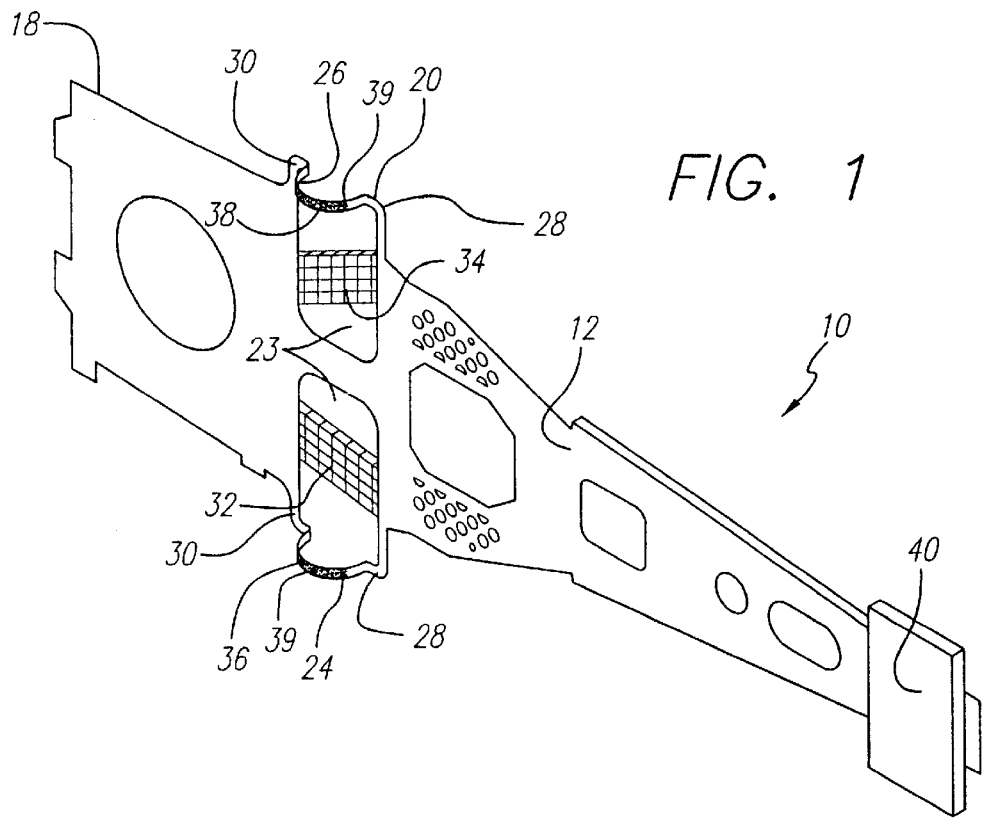
FIG. 1 is a perspective view of a two-spring element spring portion load beam according to the invention, at rest.
Figure 2:
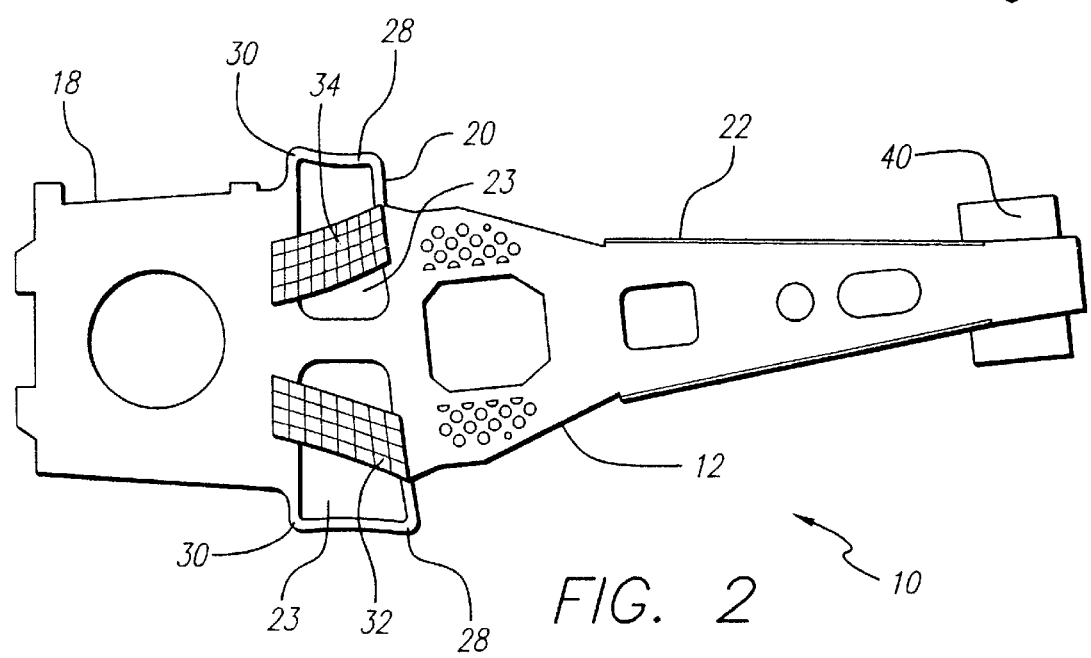
FIG. 2 is perspective view of the load beam of FIG. 1, with the microactuators operating to displace the beam portion.
Figure 4:
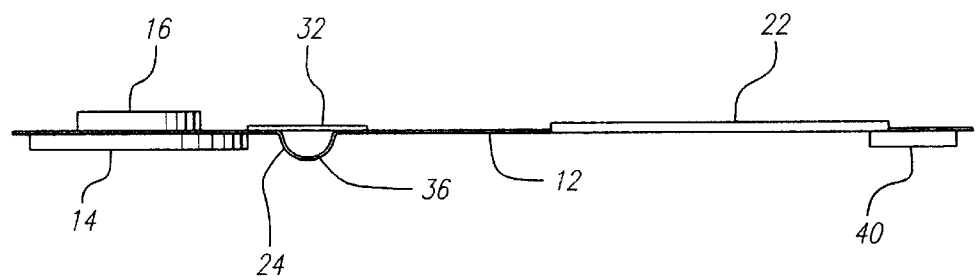
FIG. 4 is a side elevation view thereof.

With reference to the drawings in detail, in FIGS. 1 and 2 load beam 10 comprises a unitary web 12 of stainless steel or other suitable spring material supported by a mount plate 14 having a boss 16 (FIG. 4). Load beam 10 has a base portion 18, fixed on the mount plate boss 16, a spring portion 20 and a beam portion 22 carrying a slider 40. Electrodynamic microactuators in the form of piezoelectric crystals 32, 34 are bonded to the base portion 18 and the beam portion 22 with resin adhesive such as a silver filled epoxy resin, or by other means. The crystals 32, 34 are arranged to traverse the openings 23 in the spring portion 20 at an angle as shown relative to the longitudinal axis of the load beam 10. Crystals 32, 34 function independently to elongate or contract in response to a positive or negative voltage being applied, exerting a force on the immovable base portion 18 and the displaceable beam portion 22. The beam portion 22 is displaced in the Y-axis a distance that is a function of the applied voltage and the mechanical resistance to bending of the beam spring portion 20 to accommodate the beam portion displacement.

Spring portion 20 comprises left and right hand spring elements 24, 26. Spring elements 24, 26 are unitary with the web 12 and formed to have forward and rearward tabs 28, 30, and arcuate sections 36, 38 intermediate typically, but generally anywhere along the length, of the spring elements and connected to the base portion 18 and beam portion 22 by their respective tabs 28, 30. The arcuate sections 36, 38 are shown as generally C-shaped and to have their imaginary chords opposite subtending an angle of 180° The arcuate sections 36, 38 extend normal to the lateral plane of the spring portion 20 (see FIG. 4) and are open to that plane, see FIG. 1. The arcuate sections 36, 38 are suitably reduced in thickness by etching to remove from 10 to 50% of the initial thickness over from 20 to 40% of the area 39 of the sections intermediate the tabs 28, 30, e.g. centrally of that area, as shown. This will enhance bendability by lessening resistance to bending relative the effort required when the arcuate sections are at their initial thickness, typically the thickness of the beam portion 22. Thusly conformed, the spring elements 24, 26 will lengthen or contract in response to relative movement between the base portion 18 and the beam portion 22. This accommodation of relative movement is the product of the radius of curvature of the arcuate spring elements 24, 26 changing. A displacement of the beam portion 22 by the elongation of the piezoelectric crystals 32, 34 will extend or contract the spring elements 24, 26 by changing their radius of curvature to a larger value (flatter) for an elongation of the crystals, or smaller (more curled) for a contraction of the crystals.

The change in curvature of the spring elements 24, 26 makes changes in the apparent length of these elements (measured as the distance between the base portion 18 and the beam portion 22 at the elements, as opposed to real length which is the length from end-to-end) a simple, nearly mechanical resistance-free step. In contrast to the forcing of real length changes in the spring portion, see spring portion 120 in FIG. 6, the FIGS. 1 and 2 embodiment simply changes the curvature of the arcuate sections 36, 38 without acting against the tensile strength of the metal web 12.

Figure 3:
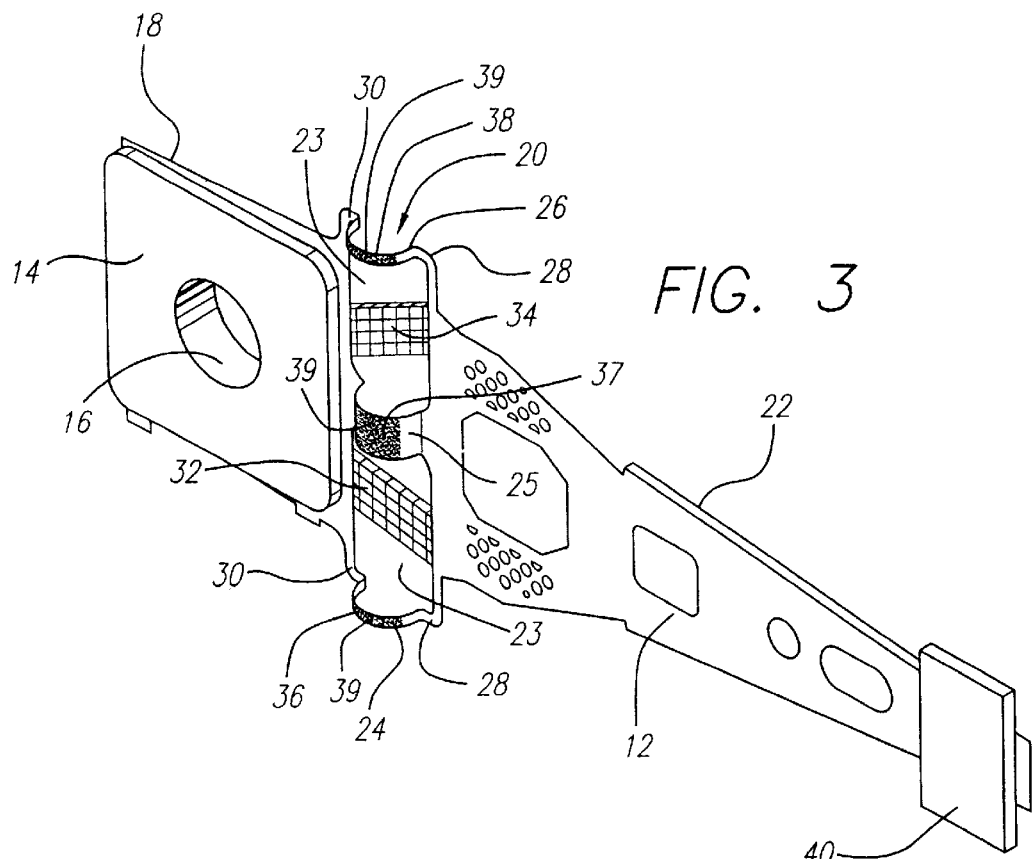
FIG. 3 is perspective view of a three-element spring portion load beam, at rest.

With reference to FIGS. 3 and 4, in which like numerals refer to like parts to FIGS. 1 and 2, a three-spring element embodiment of the invention is shown. Load beam spring portion 20 comprises three spring elements: 24, 25 and 26, with the added spring element 25 being central to the load beam, disposed along the longitudinal axis thereof and between the left and right hand spring elements 24, 26. The functioning of the spring elements is as just described. Arcuate sections 36, 37 and 38 bend, flex and change in curvature to accommodate displacement of the beam portion 22 by the dimensionally variable piezoelectric crystals 32, 34.

The reduced thickness feature at 39 in the arcuate portions 26, 37 and 38 enables a less stiff microactuator spring. Less force is thus required to actuate the suspension. More force would produce more reactive force, and hence higher shear stress at the epoxy joint between the piezoelectric crystal and the suspension body arcuate sections. The etched, reduced cross-section spring requires less force to bend as needed, effecting a reduction in the shear forces and stress levels and ultimately improves reliability of the apparatus. In general, a reduced thickness arcuate section is more flexible, bends easier, extends and contracts more readily and the voltage inputs can be even lower than 40 volts while obtaining the desired translation movement.

As noted above, the typical piezoelectric crystals used herein have a thickness of about 0.0075 inch and are able to receive applied charges of about ±40 volts. With reference to FIG. 5, the displacement of the beam portion 22, at the slider 40 area, is a function of the applied voltage and the mechanical resistance of the beam, particularly the beam spring portion 20, to displacement. More resistance means less displacement, other things being equal. This can be seen in comparing the displacement achieved with 40 applied volts with the invention arcuate-sectioned spring portion elements, upper line, and the flat inflexibly dimensioned spring portion 120 of FIG. 6, lower line. Displacement at 40 volts of the beam portion 22 of the invention arcuated load beam was the desired 2 micrometers, while the nonarcuated spring portion-provided load beam 110 (FIG. 6) achieved only 1.5 micrometers displacement at the same 40 volts being applied.

The invention thus provides an improved suspension in which actuation for displacement by a piezoelectric microactuator is realized to a greater extent from a given applied voltage by utilizing a load beam having specially conformed spring elements to support the beam portion but also to readily allow changes in dimension of the spring portion through the decrease or increase in an arcuate section of the spring elements. The foregoing objects are thus met.

We claim:

1. A disk drive suspension comprising a load beam having a base portion, a spring portion and a beam portion adapted to carry a slider in operating proximity to a disk, a dimensionally variable electrodynamic microactuator coupled to said base portion and said beam portion and across said spring portion in beam portion displacing relation to said base portion over a distance that is a function of an applied voltage to said microactuator and the resistance of said spring portion to changes in dimension, said spring portion being arcuate in a plane normal to said beam portion and locally bendable to provide low resistance change in spring portion dimensions, whereby said beam portion is displaced an increased distance at a given applied voltage.

2. The disk drive suspension according to claim 1, in which said suspension includes left and right hand microactuators acting from said base portion on said beam portion in displacing relation.

3. The disk drive suspension according to claim 1, in which said microactuator is angled relative to the longitudinal axis of said load beam in a manner to apply a torque force on said spring portion.

4. The disk drive suspension according to claim 1, in which said microactuator comprises a piezoelectric crystal.

5. The disk drive suspension according to claim 1, in which said applied voltage is less than about 40 volts, and said beam portion is displaced up to 2 micrometers in the Y-axis.

6. The disk drive suspension according to claim 1, in which said spring portion is locally reduced in thickness relative to said beam portion thickness for reduced resistance to bending.

7. The disk drive suspension according to claim 2, in which said microactuator is angled relative to the longitudinal axis of said load beam in a manner to apply a torque force on said spring portion.

8. The disk drive suspension according to claim 7, in which said microactuator comprises a piezoelectric crystal.

9. The disk drive suspension according to claim 8, in which said applied voltage is less than about 40 volts, and said beam portion is displaced up to 2 micrometers in the Y-axis.

10. The disk drive suspension according to claim 9, in which said spring portion is locally etched to a reduced thickness relative to said beam portion thickness for reduced resistance to bending.

11. A disk drive suspension comprising a load beam having a base portion, a spring portion and a beam portion extending in a plane and adapted to carry a slider in operating proximity to a disk, a left and right hand, dimensionally variable, piezoelectric crystal microactuator each coupled to said base portion and said beam portion and across said spring portion in beam portion displacing relation to said base portion over a distance that is a function of an applied voltage to said microactuator and the resistance of said spring portion to changes in dimension, said spring portion comprising left and right locally arcuate spring elements extending normal to the plane of said beam portion, said spring elements providing low resistance change in spring portion dimensions, whereby said beam portion is displaced an increased distance at a given applied voltage.

12. The disk drive suspension according to claim 11, in which each said spring element having an arcuate section, said arcuate sections tending to flatten to a greater radius curve when said spring portion element is elongated by action of said microactuator and to curl to a lesser radius curve when said spring portion element is contracted by action of said microactuator and individually for each spring element.

13. The disk drive suspension according to claim 11, in which said left and right hand microactuators are angled to converge toward each other at the proximate end of said load beam toward the longitudinal axis of said load beam in a manner to each apply a separate torque force on said spring portion.

14. The disk drive suspension according to claim 11, in which said each said arcuate spring element has an arcuate section intermediate the spring element ends, said arcuate sections tending to flatten to a greater radius curve when said spring portion element is elongated by action of said microactuator and to curl to a lesser radius curve when said spring portion element is contracted by action of said microactuator and individually for each spring element.

15. The disk drive according to claim 11, in which each said arcuate spring element comprises a unitary part of a common web with said beam base portion and said beam portion, said spring element having fore and aft tabs connected to said beam and base portions respectively and an arcuate section connected to said fore and aft tabs in beam supporting relation relative to said base, said spring elements being generally parallel, separated and of like curvature in their arcuate sections, said spring element arcuate sections being etched over the central portion thereof to a reduced thickness relative to the remainder of said arcuate sections.

16. The disk drive according to claim 11, in which said spring portion comprises left and right spring elements, and said microactuator right and left piezoelectric crystals are coupled between said base and beam portions inboard of said left and right spring elements.

17. The disk drive according to claim 11, in which each said piezoelectric crystal in about 0.0075 inch in thickness, said applied voltage is less than 40 volts, and said beam portion is displaced up to 2 micrometers in the Y-axis.

18. The disk drive suspension according to claim 12, in which said left and right hand microactuators are angled to have their proximate ends converge toward the proximate end of said load beam and the longitudinal axis of said load beam in a manner to each apply a separate torque force on said spring portion.

19. The disk drive suspension according to claim 18, in which each said arcuate spring element has an arcuate section intermediate the spring element ends, said arcuate sections tending to flatten to a greater radius curve when said spring portion element is elongated by action of said microactuator and to curl to a lesser radius curve when said spring portion element is contracted by action of said microactuator and individually for each spring element.

20. The disk drive according to claim 19, in which each said arcuate spring element comprises a unitary part of a common web with said beam base portion and said beam portion, said spring element having fore and aft tabs connected to said beam and base portions respectively and an arcuate section connected to said fore and aft tabs in beam supporting relation relative to said base, said spring elements being generally parallel, separated and of like curvature in their arcuate sections.

21. The disk drive according to claim 20, in which said microactuator right and left piezoelectric crystals are coupled between said base and beam portions inboard of said left and right spring elements.

22. The disk drive according to claim 21, in which each said piezoelectric crystal in about 0.0075 inch in thickness, said applied voltage is less than 40 volts, and said beam portion is displaced up to 2 micrometers in the Y-axis.

23. The method of actuating the beam portion of a load beam having a base portion, a spring portion and a beam portion, including shifting the left and/or right hand side of said beam portion responsive to a torque forces exerted by a microactuator between said base portion and said beam portion, and supporting said beam portion with a load beam spring portion comprising left and right hand arcuate spring elements normal to the plane of said beam portion that are bendable under said microactuator forces.

24. The method according to claim 23 including also defining an arcuate portion in each spring element that increases or decreases in radius in response to exertion of torque forces to facilitate greater distance beam displacement at lower levels of voltage.

25. The method according to claim 24, including also defining an etched zone of reduced thickness intermediate the ends of said spring element arcuate portion.

* * * * *